(12) United States Patent
Kratochwill

(10) Patent No.: US 6,220,534 B1
(45) Date of Patent: Apr. 24, 2001

(54) MATERIALS HANDLING APPARATUS AND METHOD

(76) Inventor: William L. Kratochwill, 11233 Terrance Rd. NE., Minneapolis, MN (US) 55434

( * ) Notice: Subject to any disclaimer, the term of this patent is extended or adjusted under 35 U.S.C. 154(b) by 0 days.

(21) Appl. No.: 09/395,850

(22) Filed: Sep. 14, 1999

(51) Int. Cl.⁷ .................................................. B02C 23/36
(52) U.S. Cl. ............................ 241/21; 241/46.01; 241/74
(58) Field of Search ........................... 241/21, 74, 46.01, 241/46.17, 299

(56) References Cited

U.S. PATENT DOCUMENTS

| | | | |
|---|---|---|---|
| 1,684,366 | * | 9/1928 | Dolbear ............................. 241/46.01 |
| 4,909,821 | * | 3/1990 | Olginsky et al. ................ 241/46.17 |

* cited by examiner

Primary Examiner—Mark Rosenbaum
(74) Attorney, Agent, or Firm—Nawrocki, Rooney & Silvertson, P.A.

(57) ABSTRACT

A system for handling erose materials including a tank for holding a liquid, and a tumbler mounted in the tank with at least an upper portion extending above the liquid level. The tumbler has a perforated or screen wall to allow materials of a selected size to pass through and fall toward the bottom of the tank. As the remaining materials pass along the tumbler, some will be broken down to the desired screen size by the tumbling action, and these too will pass through the tumbler wall and fall toward the tank bottom. The unselected materials will continue to be treated by tumbling until they pass out of the tumbler. A first conveyor mounted in the tank collects and conveys screened materials out of the tank. A second conveyor mounted in the tank collects and conveys unscreened materials that pass through the output end of the tumbler out of the tank.

11 Claims, 4 Drawing Sheets

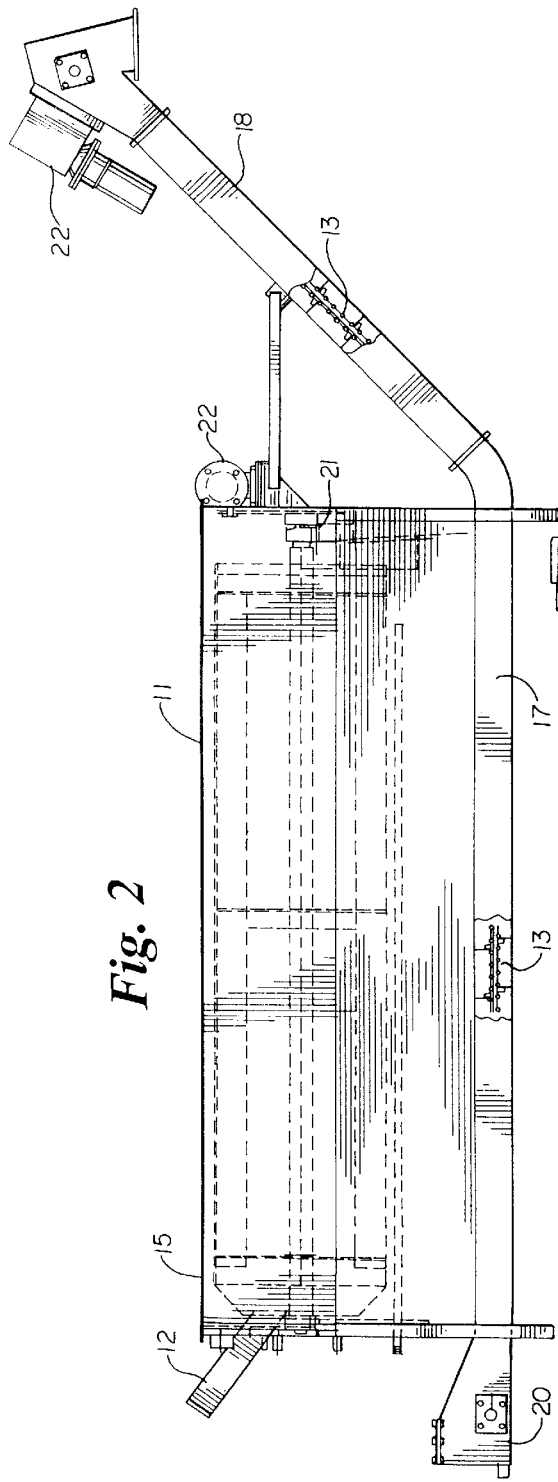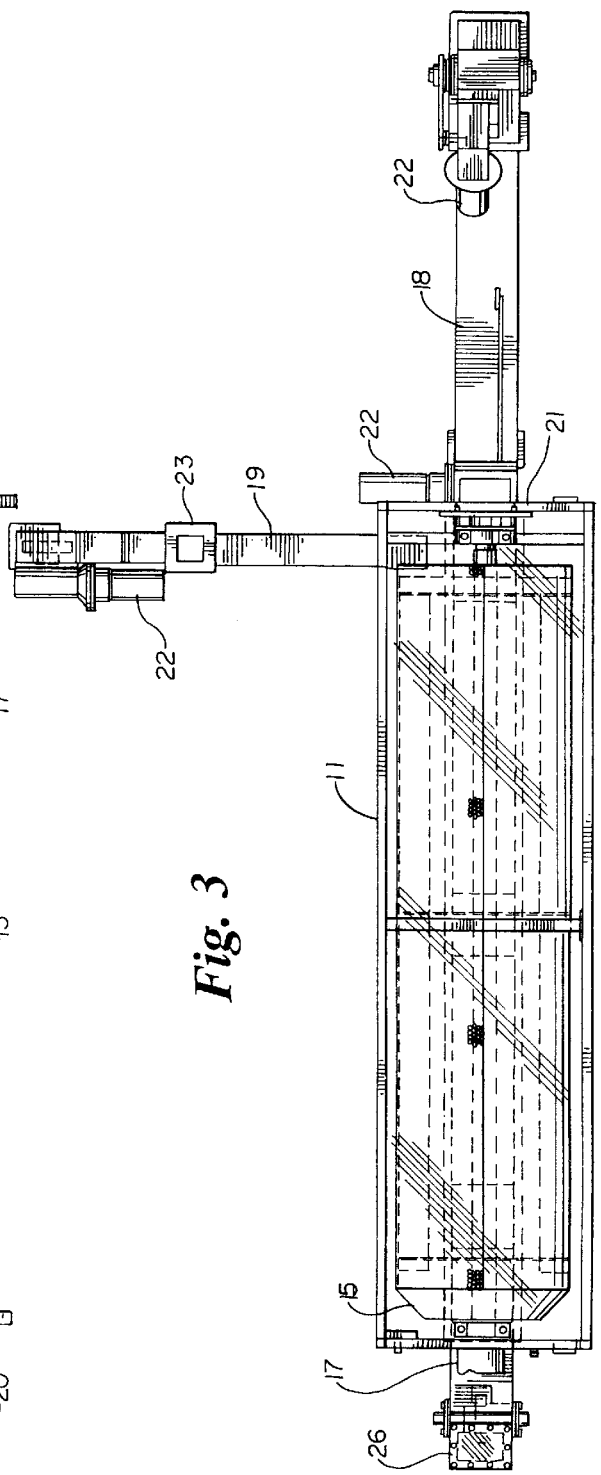
Fig. 2
Fig. 3

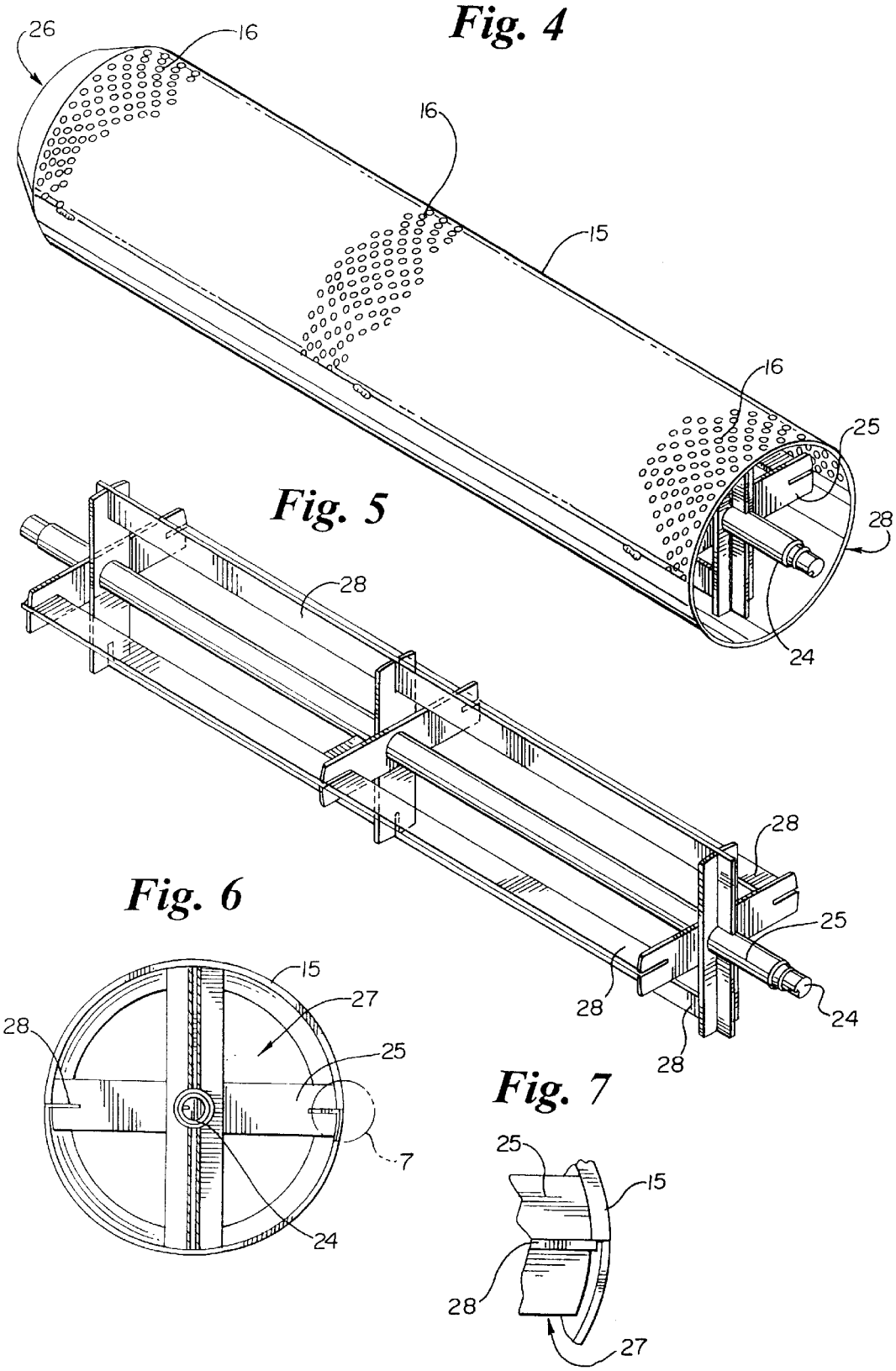

MATERIALS HANDLING APPARATUS AND METHOD

BACKGROUND OF THE INVENTION

1. Field of the Invention

The present invention relates generally to a materials handling apparatus and method. More specifically, the present invention comprises apparatus and method for the selection and treatment of erose solid materials; and still more particularly, the apparatus and method of this invention is a solids separator and/or a pre-extractor system for extractors used to remove a liquid from a solid carrier medium in which the liquid is entrained.

2. Description of the Prior Art

The handling and treatment of erose materials is a necessary process which traverses a broad range of commercial and industrial operations. A vast array of materials handling systems and methods exist in the prior art. These systems and processes include such well-known functions as the transporting, selection, separation, liquid extraction and storage of selected solid materials. For example, transport is often done by means of a conveyor system; sorting, selection and separation are often accomplished through the use of a rotating, tumbler-like drum; and extraction is often accomplished by moving the solid materials through a tank which carries a solvent. These and many other forms of materials handling are well-known in the art, and various combinations thereof are also well-known in the art.

See, for example, International Patent Publication No. WO 94/26377. This international application is entitled CONTACTOR CONSTRUCTION and describes in full detail a material handling system which includes a tumbler or rotating drum for treatment and selection of erose materials. Though cited here as an example of the prior art within the field of the present invention, it should be noted that the form of drum or tumbler device described in the cited patent publication is, in its specifics, significantly different than a rotating drum which is used in, and forms a part of, the present invention, and which is more fully described below.

Yet another example of the general prior art may be found in U.S. Pat. No. 4,751,060 issued Jun. 14, 1988 for an EXTRACTOR, and assigned to the assignee of the present invention. This patent for an improved extractor defines a system for conveying solid materials through a solvent tank and for removing a liquid from the solid materials in which the liquid is entrained. The cited patent utilizes a serial group of transport devices in the form of conveyor belts mounted in a large solvent tank and apparatus for the removal of the treated materials. Though the present invention also uses at least one liquid holding tank and a plurality of conveyor belts, these items, by themselves, are well-know in the prior art, and it is in the specific construction of the system using these devices and the process for handling the materials where the present invention lies.

One of the problems associated with the plethora of prior art in the materials handling field of the present invention is difficulty in finding a known system of devices or processes which will accomplish specific purposes required for a desired commercial or industrial use. The apparatus of this invention overcomes certain problems of the prior art by providing a specific construction of devices, utilized in a unique process, each of which construction and process comprise portions of the present invention, more fully described below.

SUMMARY OF THE INVENTION

Briefly stated, the present invention comprises apparatus including a rotating tumbler or drum mounted within a solvent holding tank. A perforated outer surface of the drum includes a plurality of apertures for the selection or screening of solids of a predetermined size. Erose solid materials are presented into the drum at an input end through a chute or similar device. A plurality of flights are mounted within the rotatable drum for continually moving the erose materials out of the liquid or solvent, which solvent is at a level within the tank lower than the uppermost portion of the rotating drum. The moving flights within the drum carry the materials to a point above the liquid solution and gravity eventually causes the materials to fall back into the liquid and thence to the lower portion of the drum. Materials which are or become within the range of the preferred or selected size will be caused to pass through the apertured or screened wall of the drum to fall to the bottom portion of the tank, still within the liquid solution. The materials too large to pass through the apertures or screening will continue to be treated by the flights within the rotating drum as they are moved by gravity and the action of the flights to the output end of the drum.

During transport of the erose materials, those which are initially too large to pass through the screened wall of the drum, may be caused to break or dissolve into the preferred sizes by the action of the lifting and dropping from and into the liquid solution. These newly formed materials of the preferred size will also pass through the apertured wall of the drum and fall to the bottom of the tank. Materials which do not break up sufficient to pass through the screening of the wall of the drum will eventually be moved through the drum and out its output end.

Materials of the preferred or selected size which pass through the vent drum and fall to the bottom of the tank will be collected by a conveyor belt at the bottom of the tank and passed through the solution and eventually out of the tank into a storage or additional treatment portion of the system. The materials which fall out of the output end of the drum will be collected by a separate and preferably transverse conveyor belt which will move these uncollected solids or materials to another portion of the system for further treatment or storage or other process as may be desired.

It will be apparent from the above description that the apparatus of this invention performs in a unique process, namely, providing erose materials to a selection drum within a solvent tank, screening out selected sizes of the input material and conveying the selected materials to a desired station. Materials which are not of the preferred dimension for screening within the drum are treated within the drum such that some of the materials will break down or dissolve into the preferred size, and these materials are also collected along with the other selected materials. Materials which do not reach the desired size during the transporting process through the drum are collected at the output end of the drum and conveyed to another station.

It will also be apparent from the above brief description of the apparatus and method of this invention that the apparatus and method may be used not only as a solid separator, as primarily described above, but may also be used for other purposes, such as for a pre-extractor in an extraction system or process.

BRIEF DESCRIPTION OF THE DRAWINGS

Other objects of the present invention and many of the attendant advantages of the present invention will be readily appreciated as they become better understood by reference to the following detailed description when considered in connection with the accompanying drawings, in which like reference numerals designate like parts through the figures whereof and wherein:

FIG. 2 is a right-side elevational view of the apparatus of this invention;

FIG. 3 is a top plan view of the apparatus of this invention, particularly illustrating the dual conveyor system of the apparatus of this invention;

FIG. 4 is a perspective view of the rotating drum of the apparatus of this invention;

FIG. 5 is a perspective view showing the internal flight portion of the apparatus of FIG. 4;

FIG. 6 is a front elevational view of the apparatus of FIG. 5;

FIG. 7 is a detailed view of a portion of the apparatus of FIG. 6;

DETAILED DESCRIPTION OF THE PREFERRED EMBODIMENTS

Figure 1:
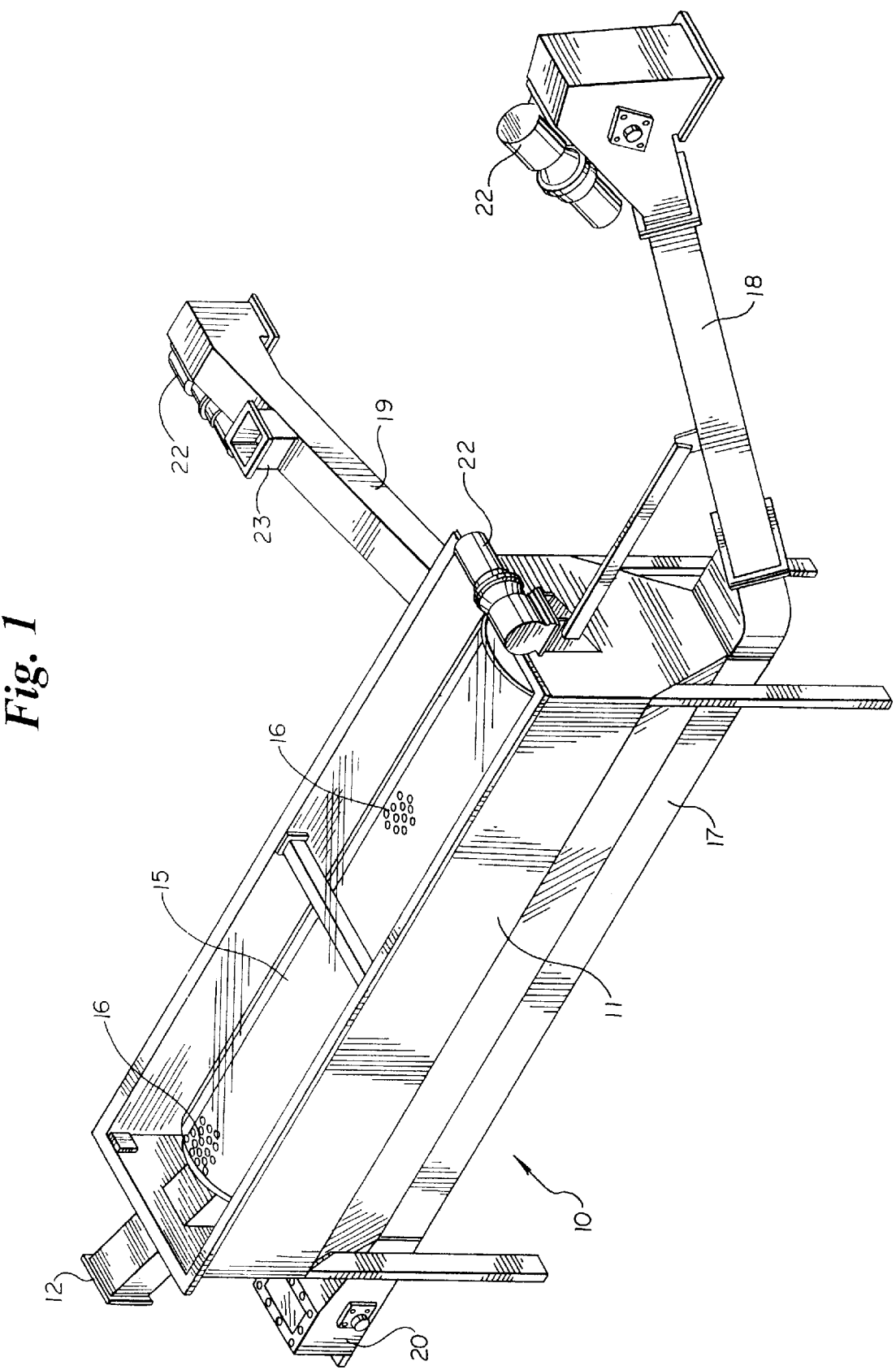
FIG. 1 is a perspective view of the apparatus of this invention.

FIG. 1 discloses the major portion of the apparatus of this invention indicated generally at 10. Apparatus 10 includes a liquid or solvent holding tank 11 in which is mounted a rotatable tumbler or drum 15. Drum 15 has an apertured or screened outer wall including a plurality of apertures indicated generally at 16. Drum 15 is mounted for rotation within tank 11 and is connected to an input chute 12 for providing a quantity of selected, usually erose materials into the apparatus 10. Those materials which are or become the preferred size to pass through apertures 16 on the wall of drum 15 fall into a transport means 17 which includes an upwardly extending chute 18 through which selected materials are transported to a desired storage or additional treatment station (not shown in FIG. 1).

Also shown in FIG. 1 is a transport chute 19 for carrying unselected materials which pass through the output end of rotatable drum 15 (shown in other figures). Transport system including chute 19 is more fully shown and described in other figures.

A drive means 20 is shown mounted on apparatus 10. A plurality of liquid traction stations 22 are also shown connected, respectively, to tank 11, chute 18 and chute 19. For purposes of clarity, the hose connections to devices 22 have been omitted from the drawing of FIG. 1. Lastly, an access port 23 is shown on chute 19.

Referring now to FIG. 2, there is shown a right-side elevational view of the apparatus of FIG. 1 for the purpose of illustrating the layout of the apparatus of this invention. It can be seen how drum 15 is rotatably mounted in tank 11. In this view, there is further shown a drum drive means 21 to provide the desired rotation of drum 15. It can also be more clearly seen how chute 12 provides for the input of materials into the input side of drum 15. It can further be seen how the transport of selected materials through chutes 17 and 18 is accomplished by a conveyor 13, shown at two cut-away portions on chute 17 and 18. Conveyor 13 is preferably an L-type conveyor, and is actuated by drive apparatus 20.

FIG. 3 is a top plan view of the apparatus of FIG. 2 which further helps to illustrate the dual conveyor system of the apparatus of this invention. Again, drum 15 is shown mounted within tank 11. Materials which are input through chute 12 (shown in cut-away) will, if of the preferred size, be collected in the manner described above by belt 13 and conveyed through chute 18. However, those materials which are and remain too large for preferential selection through apertures 16 of drum 15 will pass through the output side of drum 15 onto the conveyor means within chute 19 to be transported to a separate station.

In FIG. 4 there is shown a perspective view of drum 15 including its screened wall having apertures 16 of a dimension for allowing the passage of preferred sizes of materials. Drum 15 is shown having an input end 26 and an output end 27. Visible through output end 27 of drum 15 is a rotatable axle 24. Mounted on axle 24 is a flight system 25.

In FIG. 5, there is shown a perspective view of the flight system 25 mounted on rotatable axle 24. It can be seen how, in this preferred embodiment, system 25 includes four flights 28, each of which comprises a generally rectangular, flat blade.

FIG. 6 is a front elevational view of the apparatus of FIG. 4 illustrating output end 27 of drum 15 and showing the relative mounting of axle 24 carrying flight system 25 with flight blades 28.

FIG. 7 is a detailed view of the encircled portion of FIG. 6 showing the relationship of flight system 25 with blade 28 in relation to a voided portion of the output end 27 of drum 15.

Figures 8, 9:
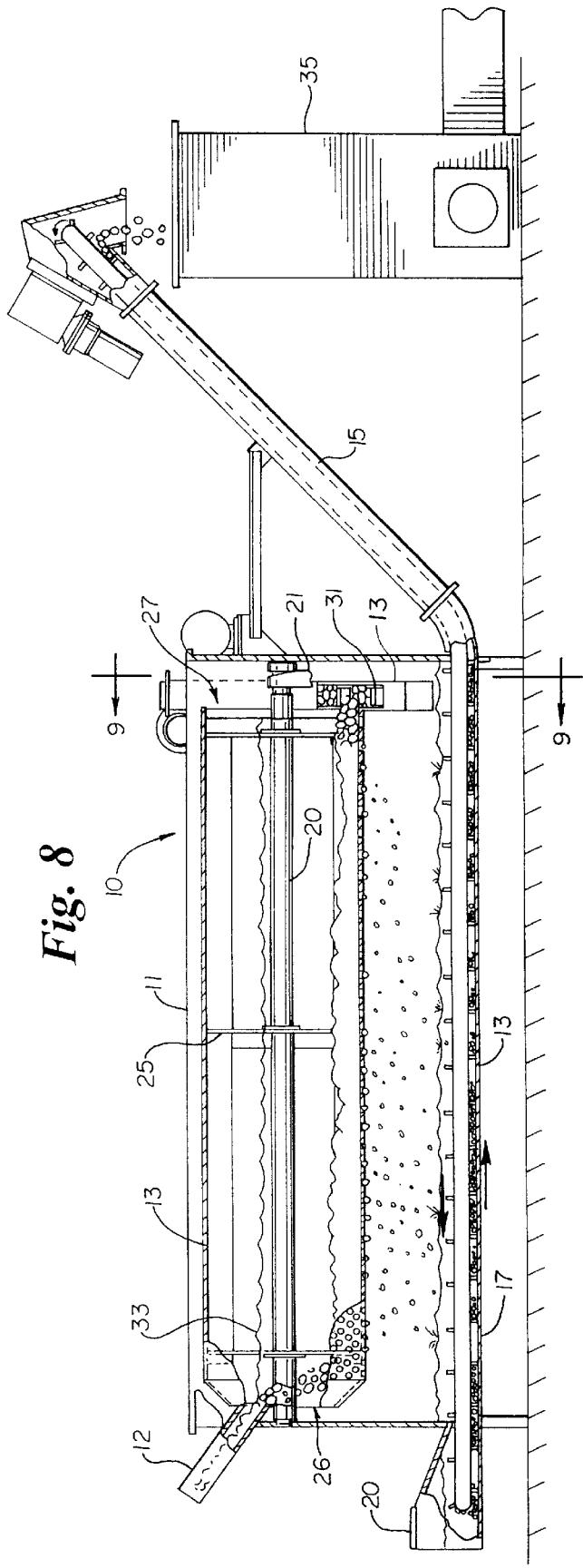
FIG. 8 is a fragmentary side elevational view of the apparatus of FIG. 1 showing the transport and storage apparatus for the materials preferentially selected by the apparatus and process of this invention.
FIG. 9 is a cut-away side elevational view of the apparatus of FIG. 8 taken along the line 9—9, showing the transport and storage system for materials rejected by the apparatus and process of this invention.

Referring now to FIG. 8, there is shown a fragmentary side elevational view of the apparatus of this invention 10 for the purpose of more clearly illustrating the operation of the apparatus on erose solid materials, and the process for such operation.

Tank 11 is shown having therein a liquid solution 33, the height of which is below the uppermost level of drum 15. In operation of the apparatus 10, erose materials are conveyed through chute 12 through the input end of 26 of drum 15. Initially these materials will fall to the bottom of the drum where they will be within solution 33. As drive apparatus 21 rotates axle 24 to actuate flight system 25, the materials within drum 15 will be moved from input end 26 toward output end 27. In general, this motion will be caused by action of flight system 25 which continuously lifts the materials above the level of solution 33 and causes the materials to fall back into solution 33 and by gravity. During the materials motion from the input toward the output end of drum 15, those pieces of materials which are of the preferred or selected size will pass through apertures 16 on the wall of drum 11 and fall through solution 33 to conveyor belt 13 within chute 17 and to chute 18 to be thereby transported out of the solution 33 and into a storage or further treatment station 35.

As the materials are moved from the input to the output end of drum 15, the action of the rotating flights on the material will cause those which are too large to pass through aperture 16 to be continuously lifted above solution 33 and dropped back therein. This constant motion and the resulting abrasion and other forces on the too-large material clumps will cause many of them to break down into the preferred or selected size. At any point along the length of drum 15 newly-formed selected sizes will pass through apertures 16 to be collected on conveyor 13.

Those clumps of materials which do not break down or dissolve into the preferred sizes will eventually pass through output 27 of drum 15 and fall by gravity onto a conveyor belt 31 within chute 19 to be conveyed to another station.

Referring now to FIG. 9, which is a cut-away side elevational view of the apparatus of FIG. 8 taken along the line 9—9, it can be seen how when the larger or waste materials which pass through drum 15 without becoming small enough to pass through apertures 16 will eventually pass through output 27 of drum 15 to fall on conveyor belt 31 and be transported through chute 19 to a point and thereafter transported to another station such as station 37 for storage or further treatment. In FIG. 9 there is shown for purposes of illustration a wash treatment apparatus 40 which can provide liquid to treat the oversized materials in station 37.

Having thus described the preferred embodiments of the present invention, it will be apparent to those of skill in the art that there are other useful embodiments which may be utilized without departing from the spirit and scope of the claims which follow.

What is claimed is:

1. Materials handling apparatus comprising:
   a. a liquid holding tank;
   b. tumbler means rotatably mounted within said tank; said tumbler means having a materials input end, a materials output end, and a wall between said input and output ends; said wall having a plurality of perforations sized to allow passage of materials of a preselected dimension;
   c. flight means mounted within said tumbler means for alternately lifting and dropping materials in said tumbler means, and for moving materials in said tumbler means from said input end to said output end;
   d. first means for collecting materials, said first collecting means mounted within said tank and below said tumbler means for collecting materials that pass through said perforated walls; and
   e. second means for collecting materials, said second collecting means mounted within said tank and below said tumbler means output end for collecting materials that pass out of said output end.

2. The apparatus of claim 1 in which said second collecting means is mounted transverse to said first collecting means.

3. The apparatus of claim 1 in which said first collecting means and said second collecting means include means for transporting collected materials from said tank.

4. The apparatus of claim 1 in which said first collecting means includes means for transporting collected materials from said tank.

5. The apparatus of claim 1 including means for filling said tank with liquid to a level below the top of said tumbler means.

6. The apparatus of claim 5 including means for filling said tank with sufficient liquid such that more than half but less than all the volume of said tumbler means is filled with said liquid.

7. Materials handling apparatus comprising:
   a. tank means for holding a selected liquid;
   b. a cylindrical drum rotatably mounted in said tank means and having an input end, an output end and a screen wall between said ends;
   c. flight means mounted within said drum for lifting and dropping materials and for moving materials from said input end to said output end;
   d. first conveyor means mounted in said tank means and below said screen wall for collecting materials which pass through said screen wall and for moving collected materials out of said tank means; and
   e. second conveyor means mounted in said tank means and below said output end for collecting materials which fall out of said output end and for moving collected materials out of said tank means.

8. The apparatus of claim 7 in which said second conveyor means is mounted transverse to said first conveyor means.

9. The apparatus of claim 7 including means for filling said tank means with the selected liquid to a level below the top of said drum.

10. The apparatus of claim 7 including means for filling said tank means with sufficient of the selected liquid such that more than half but less than all the internal volume of said drum is filled with said liquid.

11. The method of processing materials comprising the steps of:
    a. providing a tank for holding liquid;
    b. mounting a rotatable tumbler in the tank and mounting flights within and on the tumbler arranged to agitate the contents as the tumbler rotates, the tumbler having input and output ends and an apertured wall between the ends;
    c. filling the tank with liquid to a level below the top of the tumbler;
    d. placing materials into the tumbler through the input end and moving the materials through the tumbler to the output end;
    e. repeatedly tumbling the materials by lifting them above the liquid level and dropping them back into the liquid as the materials are being moved from the tumbler input end to the output end;
    f. collecting materials that pass through the apertured wall and conveying such collected materials out of the tank; and
    g. collecting materials that pass out of the output end of the tumbler and conveying such collected materials out of the tank.

* * * * *